S. K. ROSSIGNOL.
RESILIENT WHEEL.
APPLICATION FILED JUNE 21, 1911.
1,039,594.
Patented Sept. 24, 1912.
2 SHEETS—SHEET 1.
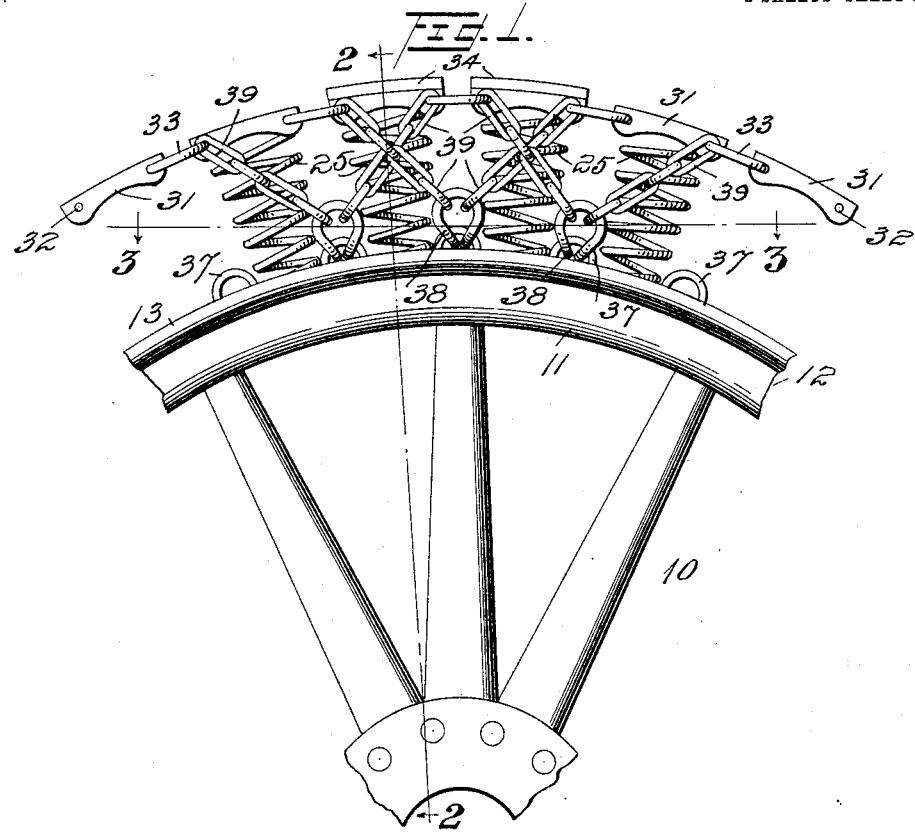
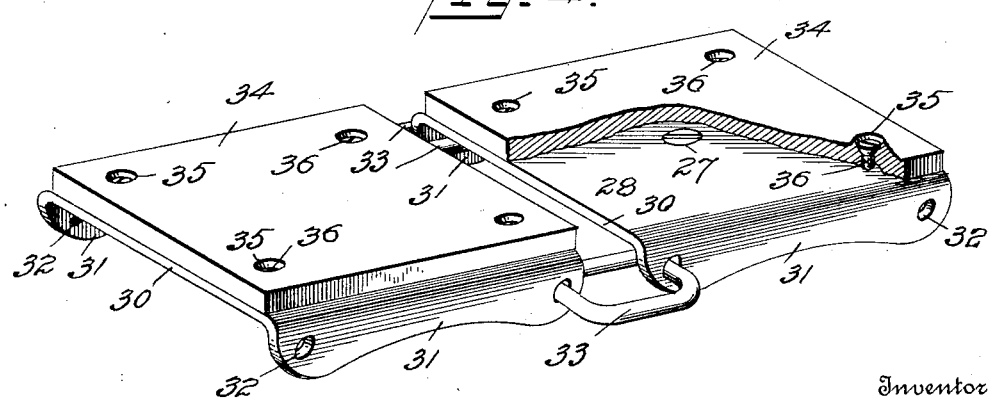
Witnesses
E. C. Duffy
F. H. Hotter
Inventor
S. K. Rossignol
By Victor J. Evans
Attorney
COLUMBIA PLANOGRAPH CO., WASHINGTON, D. C.

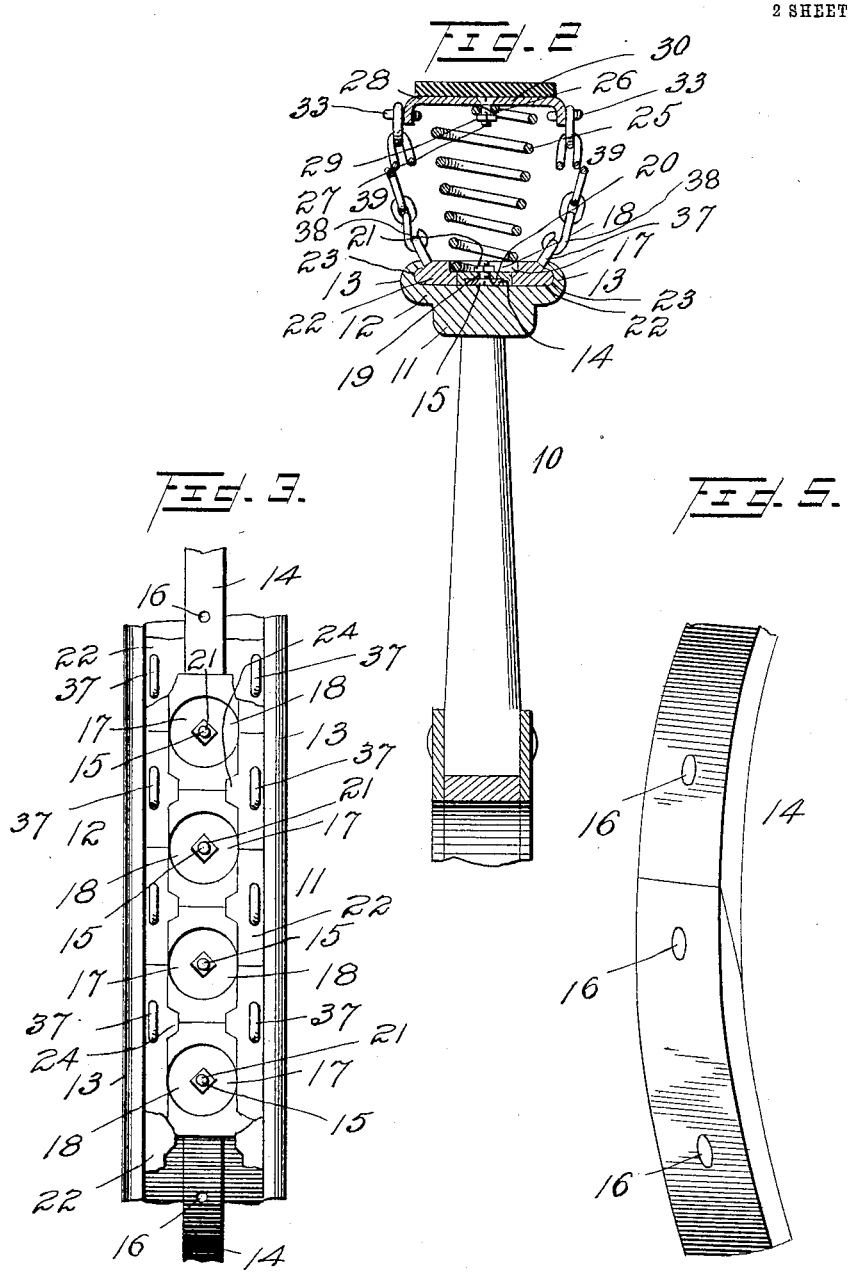

UNITED STATES PATENT OFFICE.

SAMUEL K. ROSSIGNOL, OF ATLANTA, GEORGIA.

RESILIENT WHEEL.

1,039,594. Specification of Letters Patent. Patented Sept. 24, 1912.

Application filed June 21, 1911. Serial No. 634,411.

*To all whom it may concern:*

Be it known that I, SAMUEL K. ROSSIGNOL, a citizen of the United States, residing at Atlanta, in the county of Fulton and State of Georgia, have invented new and useful Improvements in Resilient Wheels, of which the following is a specification.

The invention relates to resilient tires and wheels and has for an object to provide a vehicle wheel embodying the resilient features of a pneumatic tire.

Among other features my invention embodies a device of efficient and durable construction and in which great resiliency is produced by the use of flexible and spring-like members.

For the purpose mentioned, use is made of a band for attachment to the felly of a vehicle wheel, spring seats secured to the said band and engaging the said felly, expansible springs positioned in the said seats, clamping bars for engagement with the felly of the vehicle and the mentioned seats, pivotally connected caps secured to the said springs and connected to the clamping bars by chains and tread members secured to the said caps.

Reference is to be had to the accompanying drawings constituting a part of this specification, in which similar characters of reference denote corresponding parts in all the views, and in which—

Figure 1 is a side elevation of a portion of a wheel, showing my device, parts being broken away to disclose the underlying structure. Fig. 2 is a vertical sectional view taken on the line 2—2 in Fig. 1, looking in the direction of the arrow. Fig. 3 is a horizontal section taken on the line 3—3 in Fig. 1 looking in the direction of the arrow, showing the spring seats and clamping bars in position. Fig. 4 is an enlarged fragmentary perspective view of a plurality of caps and the treads thereon, a portion of one of the treads being broken away to disclose the underlying structure. Fig. 5 is a fragmentary perspective view of the rim band, showing the manner of connecting the ends thereof.

Referring more particularly to the various views I provide a vehicle wheel 10 having a felly 11 on which is formed a rim 12 having the edges formed into integral curved flanges 13. A rim band 14 is passed over the rim 12 between the flanges 13 and the ends of the rim bands are adapted to overlap, bolts 15 being passed through apertures 16 at spaced distances on the rim band with one of the bolts extended through the overlapping ends of the rim band to retain the said ends in engagement. A series of spring seats 17 are provided having depressions 18 formed therein and provided with apertures 19 through which the ends of the bolts 15 are passed, thus connecting the spring seats to the rim band 14, the said spring seats being provided with indented portions 20 on the under side thereof to receive the rim band 14 so that portions of the spring seats will engage the rim 12 as shown in Fig. 2, nuts 21 being threadedly engaged with the bolts 15 to rigidly retain the spring seats 17 on the rim band 14 and the spring seats 17 being spaced from the flanges 13 of the rim 12. Clamp bars 22 are provided for disposal between the flanges 13 of the rim 12 and the sides of the spring seats 17, the said clamp bars being preferably positioned on the rim 12 before the spring seats 17 are secured to the rim band 14. The clamp bars 22 have curved sides 23 and the said clamps are adapted to be positioned in the recesses formed by the curved flanges 13 so that the said flanges will overlap the clamp bars and the clamp bars are provided with lugs 24, the said lugs being adapted to engage the ends of adjacent spring seats with the extremities of each clamp bar in engagement with the sides of adjacent spring seats.

Helical springs 25 are adapted to be received in the depressions 18 of the spring seats 17 and the upper projecting ends 26 of the springs 25 are looped to receive the ends of bolts 27 passed through caps 28, nuts 29 being provided to rigidly retain the ends 26 of the springs 25 in engagement with the bolts 27.

The caps 28 each consist of a top plate 30 through which the bolt 27 is passed and integral side flanges 31 having apertures 32 through which connecting links 33 are passed, thus pivotally connecting adjacent caps, the ends of the said caps being slightly spaced from one another. Secured to the top plate 30 of the caps 28 are tread members 34 preferably consisting of an elastic material such as rubber or the like and the said tread members are provided with apertures 35 through which bolts 36 are passed to secure the tread members to the top plates 30, the said bolts being preferably countersunk as shown in Fig. 4.

Extending upwardly from the clamps 22 are eyes 37 having hooks 38 connected thereto, chains 39 having their ends connected to the hooks 38 and the links 33 connecting the caps 28, the chains 39 being arranged diagonally with the end of one of the chains connected to one of the hooks 38 and the other end of the chain connected to the next adjacent link 33 connecting the caps 28, as will be seen in Fig. 1.

The springs 25 are of an expansible nature and when an inward pressure is exerted on the tread members 34 the springs will be slightly compressed, but will be prevented from being moved out of their proper position by the spring seats 18 in which the lower ends of the springs are seated and the bolts 27 connecting the upper ends of the springs to the caps 28. The chains 39 will limit any lateral side movement of the caps 28 while at the same time the said chains will not prevent the springs 25 from being compressed when a pressure is exerted on the tread members 34. Thus it will be seen that with a wheel of the construction described a device is produced embodying an efficient degree of resiliency, while the wear and tear thereon will not be as great as the wear and tear on pneumatic tires such as have been used heretofore, the mentioned features being preferably constructed of metallic materials with the exception of the treads 34 which are preferably made of rubber. With the provision of the treads 34 any skidding of a vehicle having my improved wheels mounted on the running gear, is avoided and if desirable the treads can be fashioned in novel designs and figures which also tend to prevent skidding.

The hooks 38 are preferably made of an integral piece of material bent to form a loop or eye, with the ends of the material bent outwardly for engagement with the eyes 37. When it is desired to connect one of the links of the chains 39 to one of the hooks 38 the link is simply pressed into the eye of the hook between the outwardly curved ends thereof, the flexibility of the material from which the hooks are made being sufficient to cause the ends of the hooks to reëngage when the link of the chain has been passed therebetween as will be readily understood.

Although for the purpose of describing my device I have shown a particular construction thereof, and specified various preferred constructions of parts of my device, it will be understood that I do not limit myself to the mentioned numerations, the scope of the invention being defined in the appended claims.

Having thus fully described the invention, what I claim as new, is:—

1. A device of the class described comprising a rim formed on the felly of a vehicle wheel, inwardly curved flanges on the said rim, a rim band for engagement with the rim, clamp bars positioned on the said rim and partially overlapped by the flanges thereof, spring seats secured to the said rim band, lugs on the said clamp bars and extending between the said spring seats, springs disposed in depressions in the said spring seats, caps engaging the upper ends of the said spring, means for rigidly connecting the springs to the caps, links pivotally connecting adjacent caps, tread members secured to the said caps, and chains connected with the said caps and the said clamp bars.

2. A device of the class described comprising a rim formed on the felly of a vehicle wheel, a rim band secured to the said rim, clamp bars positioned on the said rim and partially overlapped by the flanges thereof, spring seats secured to the said rim band, helical springs having the lower ends disposed in depressions in the said spring seats, caps secured to the upper ends of the said springs, means for pivotally connecting the said caps, hooks connected with the said clamp bars, and chains diagonally positioned to connect the said caps with the said clamp bars.

3. A device of the class described comprising a rim formed on the felly of a vehicle wheel, curved flanges integrally formed on the said rim, clamp bars positioned on said rim in recesses formed by the flanges on the rim, spring seats engaging the said rim and rigidly positioned between the said clamp bars, springs mounted in depressions in the said seats, caps secured to the said springs, means pivotally connecting adjacent caps, and chains connecting the said caps and the said clamp bars.

In testimony whereof I affix my signature in presence of two witnesses.

SAMUEL K. ROSSIGNOL.

Witnesses:
W. P. WHEELESS,
A. J. HAYGOOD.

---

Copies of this patent may be obtained for five cents each, by addressing the "Commissioner of Patents, Washington, D. C."